United States Patent
Sun et al.

(10) Patent No.: US 8,158,925 B2
(45) Date of Patent: Apr. 17, 2012

(54) ROTOR TYPE ORIENTATION SENSOR HAVING PLURAL EMITTERS AND TWO RECEIVERS

(75) Inventors: Tsung-Ting Sun, Chung-Ho (TW); Chung-Ping Feng, Chung-Ho (TW)

(73) Assignee: Edison Opto Corporation, Taipei (TW)

( * ) Notice: Subject to any disclaimer, the term of this patent is extended or adjusted under 35 U.S.C. 154(b) by 402 days.

(21) Appl. No.: 12/627,207

(22) Filed: Nov. 30, 2009

(65) Prior Publication Data

US 2011/0127407 A1 Jun. 2, 2011

(51) Int. Cl.
*G01D 5/34* (2006.01)
(52) U.S. Cl. .................. 250/231.13; 250/239
(58) Field of Classification Search .......... 250/231.13, 250/231.18, 239, 458.1, 459.1, 221; 341/11, 341/13; 180/9.3, 9.38–9.44; 701/36, 41; 702/150, 151; 455/89, 575.1; 200/61.52, 200/61.02
See application file for complete search history.

(56) References Cited

U.S. PATENT DOCUMENTS 6,884,991 B2 * 4/2005 Durocher ................ 250/231.13

FOREIGN PATENT DOCUMENTS

TW I313349 8/2009

\* cited by examiner

*Primary Examiner* — Que T Le
(74) *Attorney, Agent, or Firm* — Chun-Ming Shihg; HDLS IPR Services (57) ABSTRACT

A rotor type orientation sensor includes a housing, a plurality of light emitters, two light receivers and a rotor. The housing has a circular tunnel and a plurality of first openings connecting to the tunnel and two second openings located on two sides of the first openings. The light emitters emit light into the tunnel through the first openings. The light receivers receive light from the tunnel through the second openings. The rotor is arranged in the tunnel, whereby while the rotor type orientation sensor is tilting, the rotor rotates toward the direction of gravity force, at least a portion of light emitted from the light emitters is blocked by the rotor, one of the light receivers is blocked by the rotor, the light receivers can respectively receive light with predetermined intensity and correspondingly output electric signals with predetermined strength.

9 Claims, 8 Drawing Sheets

ROTOR TYPE ORIENTATION SENSOR HAVING PLURAL EMITTERS AND TWO RECEIVERS

BACKGROUND OF THE INVENTION

1. Field of the Invention

The present invention relates to a sensor, in particular to a rotor type orientation sensor.

2. Description of Related Art

As the popularization of the portable electronic apparatuses like digital camera or camera phone, it has become normal to watch pictures on the screen of them. Therefore, a picture-rotating function which can rotate pictures on the screen while the apparatuses are rotating is gradually added into the portable electronic apparatuses.

Figure 1:
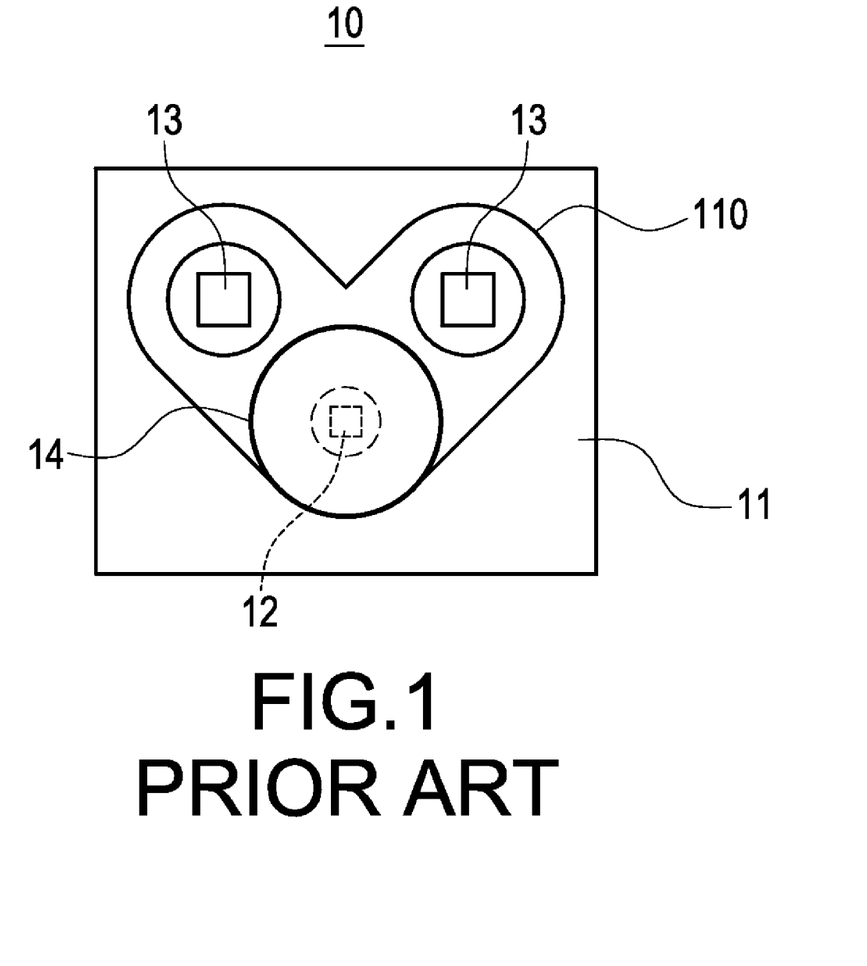
FIG. 1 is a schematic view of a conventional tilt sensor.

Refer to FIG. 1, a conventional tilt sensor 10 is disclosed by the Taiwan patent application No. 95142815. The tilt sensor 10 is installed into the abovementioned apparatuses and can sense the rotation of the apparatuses. Then, the tilt sensor 10 can output corresponding signals for changing the display orientation of pictures. As FIG. 1 shows, the tilt sensor 10 includes a shell 11 having a V-shaped groove 110, a light emitting device 12 used for emitting light into the V-shaped groove 110, two light receivers 13 used for receiving light from the V-shaped groove 110, and a sliding member 14 used for sliding in the V-shaped groove 110. While the tilt sensor 10 is clockwise or counterclockwise rotated with respect to the direction of gravity, the sliding member 14 is going to slide from the central lower position toward the two upper sides of the V-shaped groove 110.

When the sliding member 14 is located at the central lower position of the V-shaped groove 110, the sliding member 14 blocks the light emitting device 12 from emitting light into the V-shaped groove. Then, the light receivers 13 sense no light from the V-shaped groove 110. When the sliding member 14 is located at either upper sides of the V-shaped groove 110, the sliding member 14 blocks one of the light receivers 13 so that the light receiver 13 blocked can not receive light from the V-shaped groove 110, but the other light receiver 13 can receive light without any affection. Therefore, the tilt sensor 10 can output a corresponding signal to control the display orientation of pictures.

However, since the sliding member 14 is only able to move between the central lower position, the left upper side or right upper side, which means that only three kinds of signals can be outputted by the tilt sensor 10. It will limit the applications of the tilt sensor 10. For example, such a tilt sensor 10 can only switch the display orientations of the pictures at three positions of a predetermined angle, 90 degrees counterclockwise and 90 degrees clockwise. However, the display orientations of the pictures can not be changed in a continuous way while the portable electronic apparatus is continuously changing its tilting angle.

SUMMARY OF THE INVENTION

The purpose of the present invention is to provide a rotor type orientation sensor which can continuously change its outputted electric signal while tilt angle or rotation angle thereof is varied continuously. Such that the rotor type orientation sensor can provide more possibilities in applications.

In order to achieve aforementioned purpose, the present invention provides a rotor type orientation sensor, including a housing, a plurality of light emitters, two light receivers and a rotor. The housing has a circular tunnel and a plurality of first openings connecting to the tunnel and two second openings respectively located on two sides of the first openings and connecting to the tunnel. The light emitters are respectively arranged at the first openings and emit light into the tunnel through the first openings. The light receivers are respectively arranged at the second openings and receive light from the tunnel through the second openings. The rotor is arranged in the tunnel and is rotatable along the extension direction of the tunnel. While the rotor type orientation sensor is tilted, the rotor rotates toward the direction of gravity force, at least a portion of light emitted from the light emitters is blocked by the rotor and is not able to pass into the tunnel, one of the light receivers is blocked by the rotor and is not able to receive light from the tunnel, the light receivers can respectively receive light with predetermined intensities and correspondingly output electric signals with predetermined strength.

BRIEF DESCRIPTION OF THE DRAWINGS

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

A detailed description of the present invention will be made with reference to the accompanying drawings.

Figure 2:
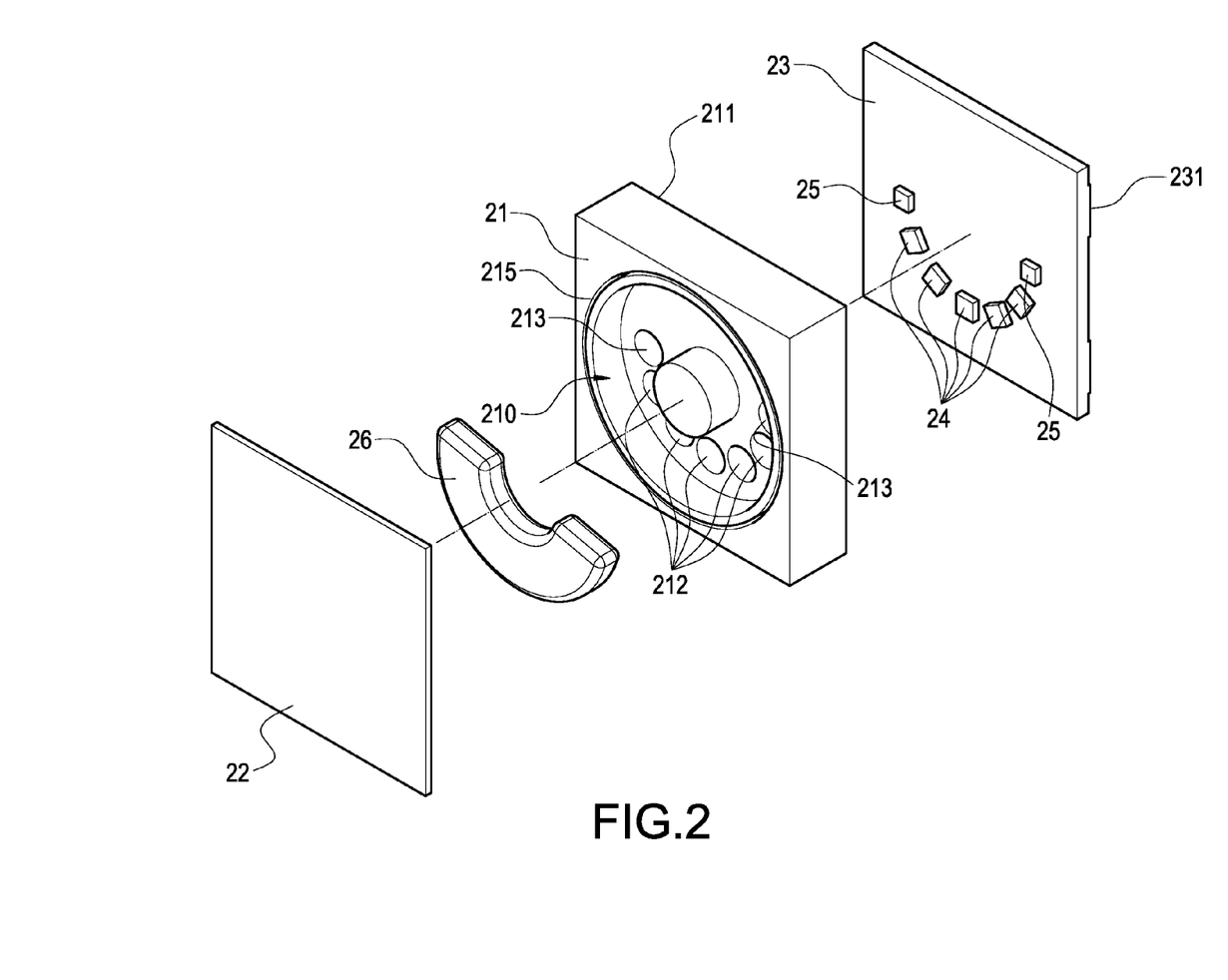
FIG. 2 is a schematic view of the rotor type orientation sensor according to first embodiment of the present invention.
Figure 3:
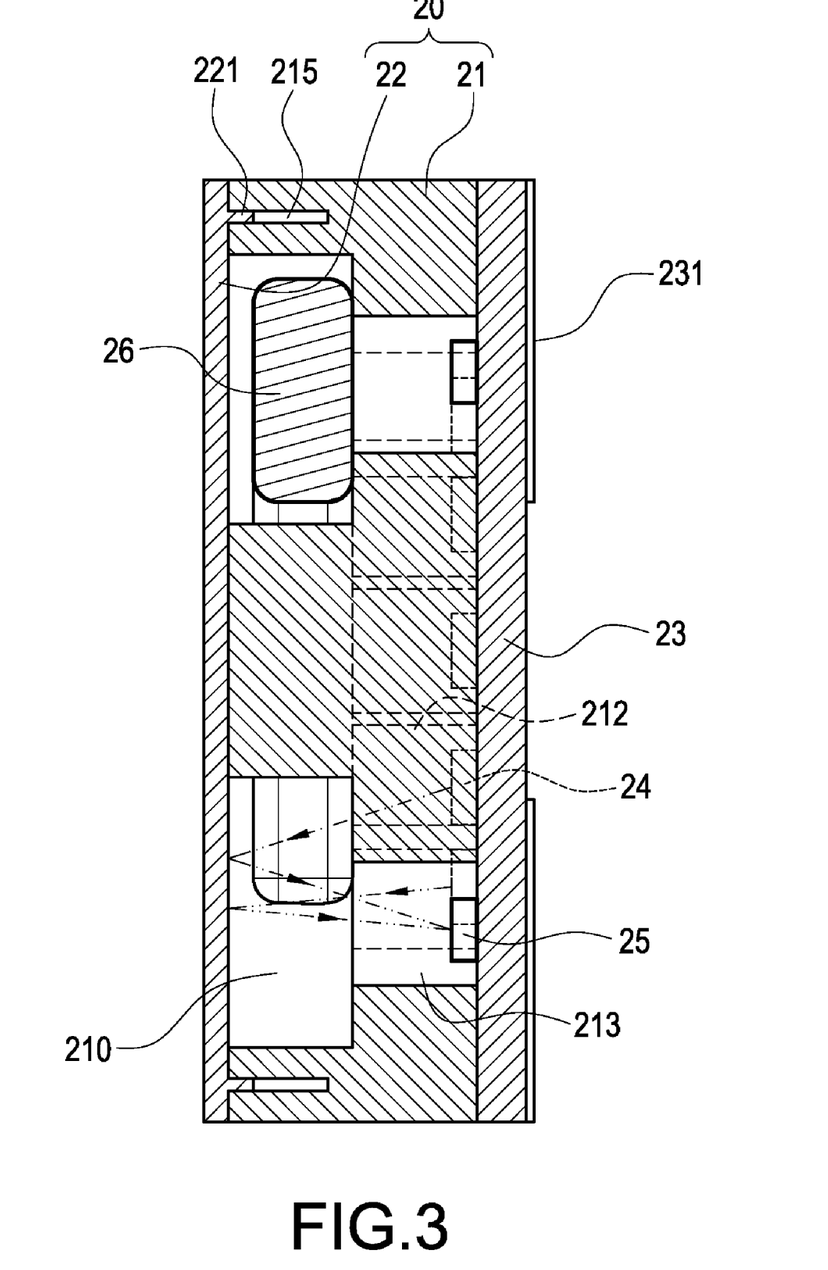
FIG. 3 is a cross-sectional view of the rotor type orientation sensor in FIG. 2.

FIG. 2 and FIG. 3 show a rotor type orientation sensor according to first embodiment of the present invention. The rotor type orientation sensor mainly includes a housing 20, a circuit board 23, a plurality of light emitters 24, two light receivers 25 and a rotor 26.

The housing 20 includes a first housing portion 21 and a second housing portion 22. A circular tunnel 210 is formed by the first housing portion 21 and the second housing portion 22. The first housing 21 has a surface 211 parallel to the extension direction of the tunnel 210. A plurality of first openings 212 and two second openings 213 are formed on the surface 211 and connect to the tunnel 210. The first openings 212 and the second openings 213 are arranged along the extension direction of the tunnel 210. The two second openings 213 are respectively located on two sides of all the first openings 210. In this embodiment, the amount of the first openings 212 is five, and the amount of the light emitters 24 is equal to the amount of the first openings 212. In practical use, the amount of the first openings 212 can be at least three.

Furthermore, the two second openings 213 are respectively located on two opposite sides of the tunnel 210. In the other words, a connecting line between the second openings 213 passes through the center of the tunnel 210.

Besides, the second housing portion 22 has a circular protrusion 221 used for correspondingly embedding in the circular groove 215. Such that the second housing portion 22 can be fixed on the first housing portion 21.

The circuit board 23 is arranged on the surface 211 of the first housing portion 21. The circuit board 23 can be a printed circuit board or a flexible circuit board. Furthermore, a plurality of conductive terminals 231 are arranged on a surface of the circuit board 23, which is opposite to the first housing portion 21. The conductive terminals 231 extend to the front face of the circuit board 23 and connect with the light emitters 24 and the light receivers 25 through the exterior or interior of the circuit board 23. Such that an exterior electric power can connect to the conductive terminals 231 and supply power to the light emitters 24 and light receivers 25, or, the signals from the light receivers 25 can output through the conductive terminals 231.

The light emitters 24 are arranged on the circuit board 23 and are located at the first openings 212. The light emitters 24 emit light into the tunnel 210 through the first openings 212. In this embodiment, the light emitters 24 are light emitting diodes, but not limited thereto in practical use.

The light receivers 25 are arranged on the circuit board 23 and are located at the second openings 213. The light receivers 25 receive light from the tunnel 210 through the second openings 213. In this embodiment, the light receivers 25 are phototransistors, but not limited thereto in practical use.

The rotor 26 is correspondingly arranged in the tunnel 210 and is rotatable along the extension direction of the tunnel 210. Preferably, the rotor 26 is of semi-circular-shaped.

Figure 4:
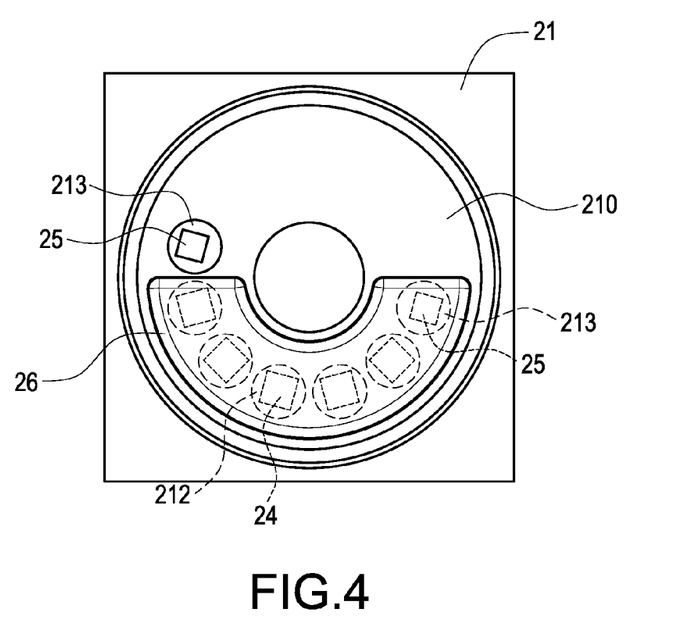
FIG. 4 to FIG. 11 are different operating views of the rotor type orientation sensor.

FIG. 4 to FIG. 11 respectively illustrates eight conditions while the rotor type orientation sensor is operating. First, as FIG. 4 shows, the direction of the gravity force is downward. The rotor 26 is spontaneously located at the lower part of the tunnel 210 where the rotor 26 has lowest potential energy. At this moment, all of the light emitters 24 and the right side light receiver 25 are blocked by the rotor 26. Only the left side light receiver 25 is not blocked by the rotor 26. In this situation, since all of the light emitters 24 can not emit light into the tunnel 210, neither the left side light receiver 25 nor the right side light receiver 25 receives any light. The left side light receiver 25 and the right side light receiver 25 can still output corresponding signals representing the light intensity they received. Those signals are the first kind of signal combination of the rotor type orientation sensor. Besides, it should be mentioned that when the rotor 26 blocks left side light receiver 25 and all of the light emitters 24 and the right side light receiver 25 is not blocked, or when the rotor 26 blocks all of the light emitters 24 and the left side light receiver 25 and the right side light receiver 25 are partially blocked, the light emitted from the light emitters 24 are all blocked by the rotor 26, the rotor type orientation sensor can also output the first kind of signal combination.

Figure 5:
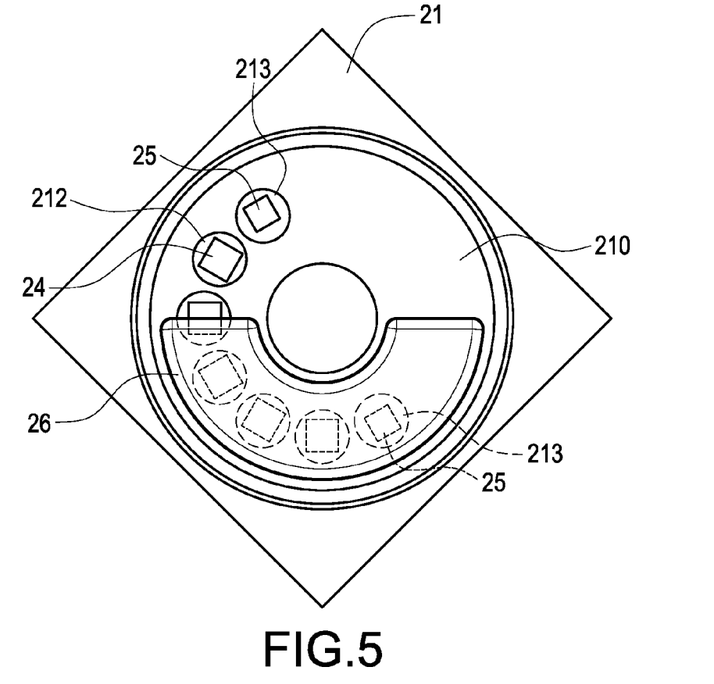

Refer to FIG. 5, the rotor type orientation sensor is clockwise rotated 45 degrees. The rotor 26 can spontaneously move to the lower part of the tunnel 210. At this moment, three and half light emitters 24 and the right side light receiver 25 are blocked by the rotor 26, and the left side light emitter 24 is not blocked by the rotor 26. Therefore, only one and half light emitter 24 are able to emit light into the tunnel 210. The left side light receiver 25 is able to receive light with predetermined intensity. The right side light receiver 25 receives no light. The left side light receiver 25 and the right side light receiver 25 can output corresponding signals representing the light intensity they received. Those signals are the second kind of signal combination of the rotor type orientation sensor.

Figure 6:
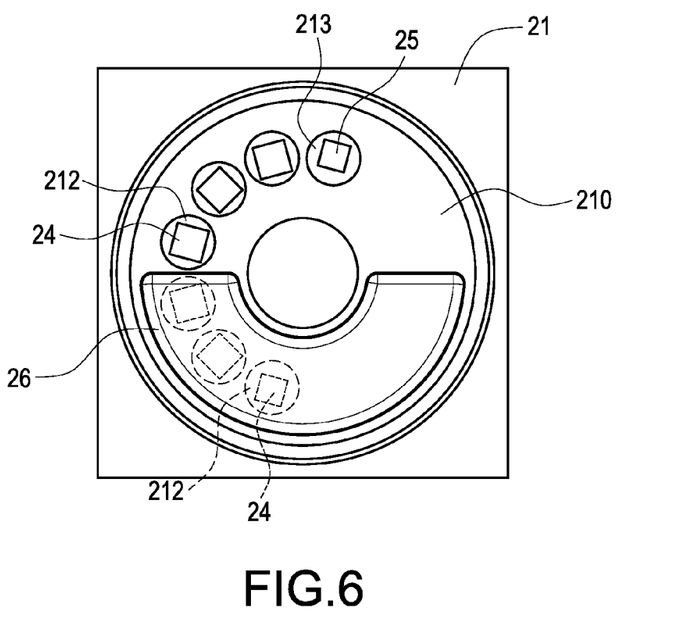
Figure 7:
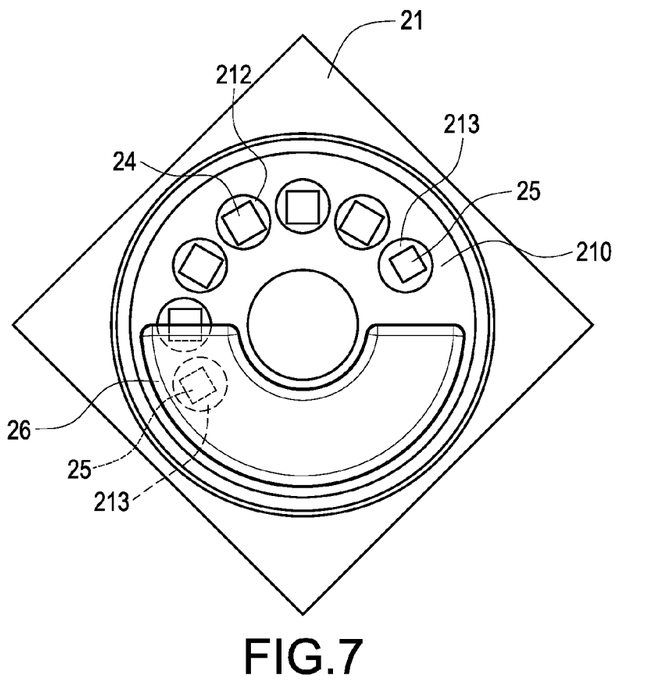
Figure 8:
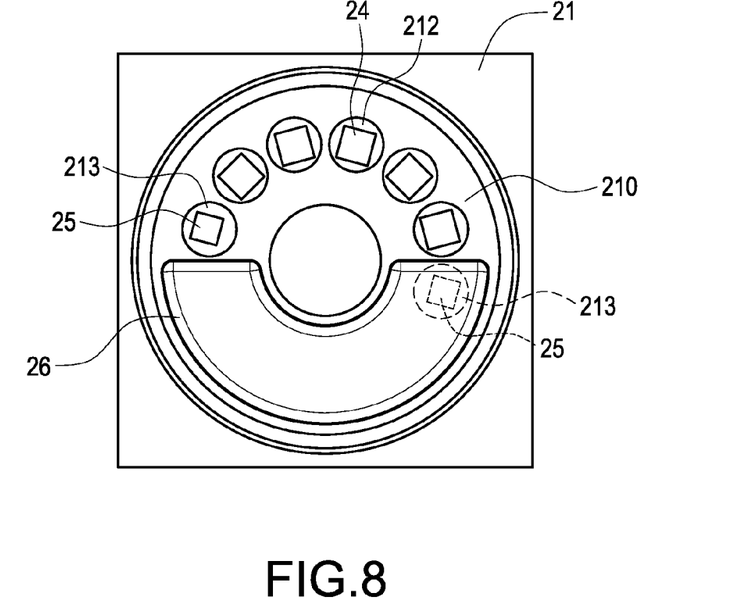
Figure 9:
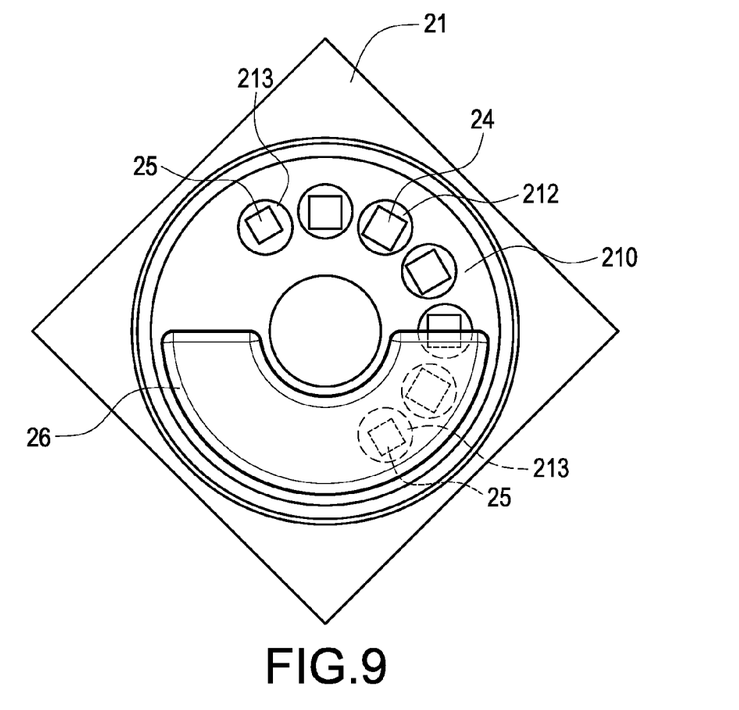
Figure 10:
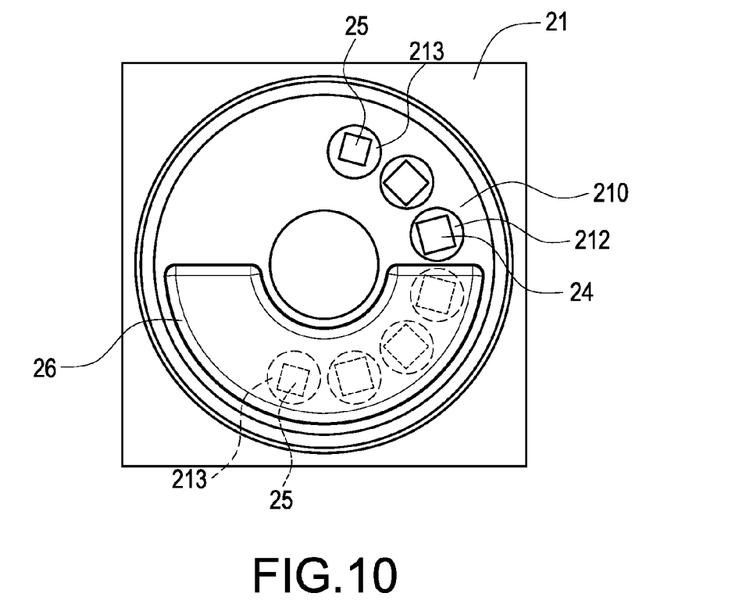
Figure 11:
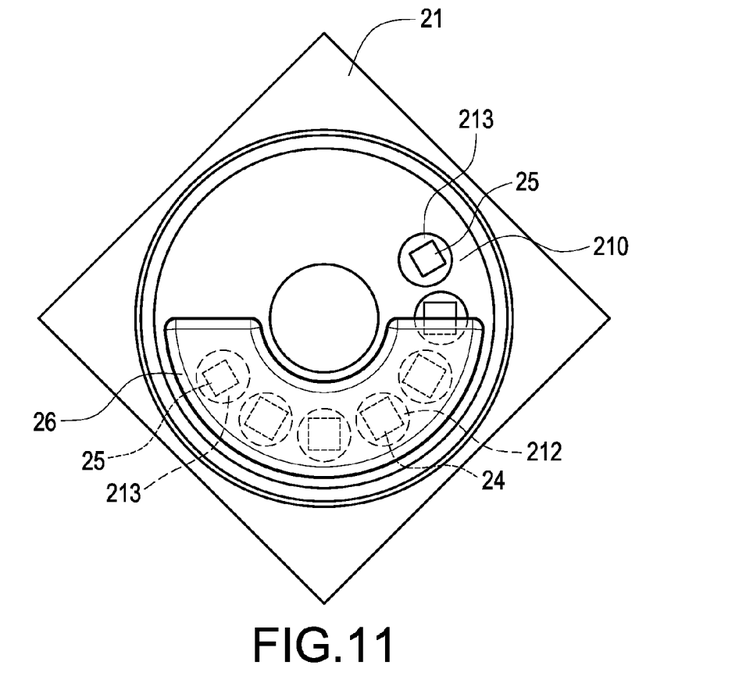

Refer to FIG. 6, the rotor type orientation sensor is further clockwise rotated 45 degrees with respect to FIG. 5. The rotor 26 can spontaneously move to the lower part of the tunnel 210. At this moment, two light emitters 24 and lower side light receiver 25 are blocked by the rotor 26, and the upper side light emitter 25 is not blocked by the rotor 26. Therefore, three light emitters 24 are able to emit light in to the tunnel 210. The upper side light receiver 25 is able to receive light with predetermined intensity. The lower side light receiver 25 receives no light. The upper side light receiver 25 and the lower side light receiver 25 can output corresponding signals representing the light intensity they received. Those signals are the third kind of signal combination of the rotor type orientation sensor.

In the same manner, the rotor type orientation sensor in the situations of FIG. 7 to FIG. 11 can respectively output the fourth to the eighth signal combination. Therefore, it will not be limited in various applications. For example, when the portable electronic apparatus having the rotor type orientation sensor is dynamically tilted or rotated, the picture displayed on the portable electronic apparatus can have more than eight kinds of display orientations.

Besides, when each of the first opening 212 continuously varies from totally blocked to partially blocked, the amount of light emitted into the tunnel 210 by the light emitters 24 will be varied correspondingly. Hence, the electric signals outputted by the light receivers 25 can be varied in an analog-like way. That means the rotor type orientation sensor can output more kind of electric signal combinations to provide more possibility in applications.

Figure 12:
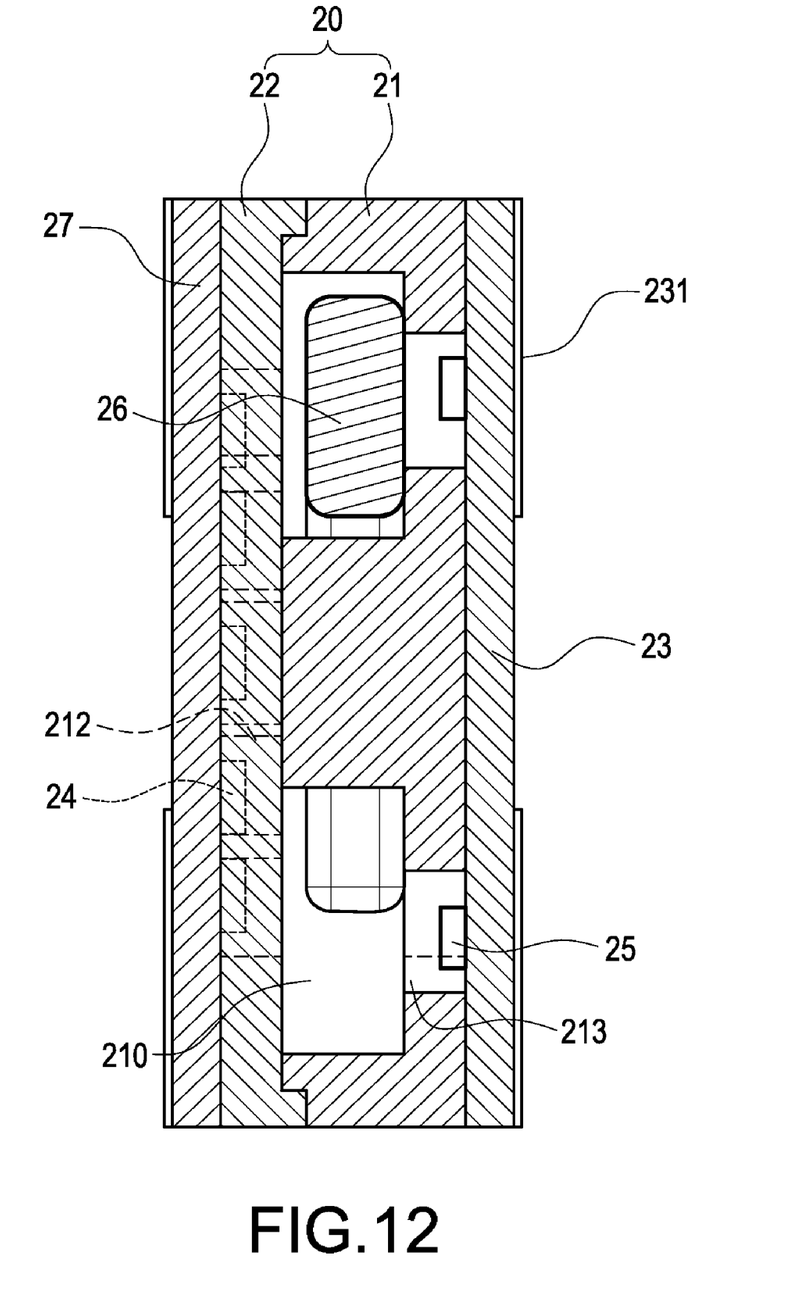
FIG. 12 is a cross-sectional view of the rotor type orientation sensor according to second embodiment of the present invention.

FIG. 12 shows a rotor type orientation sensor according to second embodiment of the present invention, which has structure similar to the first embodiment. The difference is that the light emitters 24 and the light receivers 25 are arranged at two opposite sides of the housing 20.

A circuit board 23 is arranged on a side of the first housing portion 21 of the housing 20 and used for carrying the light receivers 25. Another circuit board 27 is arranged on another side of the housing 20 and used for carrying the light emitters 24. Besides, the first openings 212 is formed on the second housing portion 22 and used for passing the light emitted from the light emitters 24 into the tunnel 210.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A rotor type orientation sensor, comprising:
    a housing having a circular tunnel and a plurality of first openings connecting to the tunnel and two second openings respectively located on two sides of the first openings and connecting to the tunnel;
    a plurality of light emitters respectively arranged at the first openings and emitting light into the tunnel through the first openings;
    two light receivers respectively arranged at the second openings and receiving light from the tunnel through the second openings; and
    a rotor arranged in the tunnel and being rotatable along the extension direction of the tunnel, whereby while the rotor type orientation sensor is tilted, the rotor rotates toward the direction of gravity force, at least a portion of light emitted from the light emitters is blocked by the rotor and is not able to pass into the tunnel, one of the light receivers is blocked by the rotor and is not able to receive light from the tunnel, the light receivers can respectively receive light with predetermined intensities and correspondingly output electric signals with predetermined strength.

2. The rotor type orientation sensor according to claim 1, further comprising an circuit board arranged on a side of the housing and used for carrying the light emitters and the light receivers.

3. The rotor type orientation sensor according to claim 1, further comprising an circuit board arranged on a side of the housing and used for carrying the light receivers, and another circuit board arranged on another side of the housing and used for carrying the light emitters.

4. The rotor type orientation sensor according to claim 1, wherein the amount of the first openings are at least three, and the amount of the light emitters is equal to the amount of the first openings.

5. The rotor type orientation sensor according to claim 1, wherein a connecting line between the second openings passes through the center of the tunnel.

6. The rotor type orientation sensor according to claim 2, wherein a plurality of conductive terminals are arranged on a surface of the circuit board, which is opposite to the housing.

7. The rotor type orientation sensor according to claim 1, wherein the light emitters are light emitting diodes.

8. The rotor type orientation sensor according to claim 1, wherein the light receivers are phototransistors.

9. The rotor type orientation sensor according to claim 1, wherein the rotor is of semi-circular-shaped.

\* \* \* \* \*